(12) United States Patent
Nakamura et al.

(10) Patent No.: US 7,094,855 B2
(45) Date of Patent: Aug. 22, 2006

(54) CONJUGATED DIENE RUBBER GEL, RUBBER COMPOSITIONS CONTAINING THE SAME AND PROCESS FOR PRODUCTION OF CONJUGATED DIENE RUBBER

(75) Inventors: Masao Nakamura, Kawasaki (JP); Koichi Endo, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 11/036,376

(22) Filed: Jan. 18, 2005

(65) Prior Publication Data

US 2005/0124760 A1 Jun. 9, 2005

Related U.S. Application Data

(62) Division of application No. 10/651,042, filed on Aug. 29, 2003, now Pat. No. 6,897,279, which is a division of application No. 10/297,393, filed as application No. PCT/JP01/04797 on Jun. 7, 2001, now Pat. No. 6,649,724.

(30) Foreign Application Priority Data

Jun. 7, 2000 (JP) .............................. 2000-171336
Jul. 31, 2000 (JP) .............................. 2000-231156

(51) Int. Cl.
 *C08F 236/10* (2006.01)
(52) U.S. Cl. ..................................... 526/340; 526/340.1
(58) Field of Classification Search ................ 526/340, 526/340.1
 See application file for complete search history.

(56) References Cited

U.S. PATENT DOCUMENTS 3,959,895 A 6/1976 Lonning
5,017,660 A 5/1991 Hattori et al.
6,127,488 A 10/2000 Obrecht et al.
6,184,296 B1 2/2001 Obrecht et al.
6,403,720 B1 6/2002 Chino et al.
6,469,104 B1 10/2002 Colvin et al.

FOREIGN PATENT DOCUMENTS

| DE | 20 57 935 A | 6/1972 |
|---|---|---|
| EP | 854170 A1 | 7/1998 |
| EP | 1063259 A1 | 12/2000 |
| EP | 1083200 A2 | 3/2001 |
| JP | 58-154711 A | 9/1983 |
| JP | 8-319327 A | 12/1996 |
| WO | WO 98/54250 A1 | 12/1998 |

OTHER PUBLICATIONS

Abstract XP 002272355 of JP 46 009474B, Mar. 10, 1971.

*Primary Examiner*—Caixia Lu
(74) *Attorney, Agent, or Firm*—Birch, Stewart, Kolasch & Birch, LLP

(57) ABSTRACT

A conjugated diene rubber gel comprising 80–99 weight % of conjugated diene monomer units and 20–1 weight % of aromatic vinyl monomer units and having a swelling index of 16 to 70 as measured in toluene. A rubber vulcanizate made from a rubber composition comprising this conjugated diene rubber gel and a rubber capable of being crosslinked with sulfur exhibits good abrasion resistance and low heat-build up without deterioration of mechanical properties, and thus, is suitable for tire materials. This conjugated diene rubber gel can be produced with high efficiency by emulsion-polymerization of a monomer mixture comprising 50–99.9 weight % of a conjugated diene monomer, 0–30 weight % of an aromatic vinyl monomer, 0–20 weight % of a crosslinking monomer.

4 Claims, No Drawings

CONJUGATED DIENE RUBBER GEL, RUBBER COMPOSITIONS CONTAINING THE SAME AND PROCESS FOR PRODUCTION OF CONJUGATED DIENE RUBBER

This application is a Divisional application of U.S. application Ser. No. 10/651,042 filed on Aug. 29, 2003 now U.S. Pat. No. 6,897,279, which is a Divisional application of U.S. application Ser. No. 10/297,393 filed on Feb. 10, 2003, now U.S. Pat. No. 6,649,724 issued Nov. 18, 2003 and for which priority is claimed under 35 U.S.C. § 120. U.S. application Ser. No. 10/297,393 is the national phase of PCT International Appln. PCT/JP01/04797 filed on Jun. 7, 2001. This application also claims priority to Japanese Application No. 2000-171336 filed in Japan on Jun. 7, 2000 and Japanese Application No. 2000-231156 filed in Japan on Jul. 31, 2000 under 35 U.S.C. § 119. The entire contents of all of these applications are herein incorporated by reference.

TECHNICAL FIELD

This invention relates to a novel conjugated diene rubber gel, a rubber composition comprising the conjugated diene rubber gel, and a process for producing a conjugated diene rubber. More specifically it relates to a conjugated diene rubber gel capable of giving a rubber composition suitable for a tire having a high abrasion resistance and a low heat-build up, and the rubber composition comprising the conjugated diene rubber gel, and a process for producing a conjugated diene rubber with enhanced productivity.

BACKGROUND ART

In recent years, improvement of various properties is required for a rubber composition used for an automobile tire. Especially, improvement of mechanical properties, abrasion resistance and appropriately reduced rolling resistance (i.e., low heat-build up) is required for a rubber composition used for sidewall and bead of an automobile tire.

Natural rubber is consumed in a large amount for an automobile tire. In many cases, other rubbers are blended with natural rubber for improving various properties of natural rubber. In one example, a polybutadiene rubber is blended for improving the abrasion resistance, and, in another example, a styrene-butadiene copolymer rubber is blended for improving the mechanical properties. However, there is a basic contradiction between properties required for a tire rubber, and thus, all of the properties required for an automobile tire are difficult to satisfy concurrently. For example, enhancement of abrasion resistance is accompanied by mechanical properties, and enhancement of mechanical properties is accompanied by increase of heat-build up.

In view of miscibility of a rubber raw material with a reinforcing agent or other additives, it is usually desired that a rubber raw material does not have a gel structure. However, a rubber gel having a gel structure has been proposed for giving a rubber having low heat-build up and high abrasion resistance. For example, a rubber composition comprising a polychloroprene gel was proposed in Japanese Unexamined Patent Publication (hereinafter abbreviated to "JP-A") No. H3-37246. This rubber composition gives a rubber exhibiting satisfactory low heat-build up and high abrasion resistance, but, as the polychloroprene gel contains chlorine, it causes a problem of damaging the environment when scrap tires are incinerated, which makes it's practical use difficult.

Further, as for a conjugated diene rubber, a rubber composition comprising a polybutadiene gel, and a rubber composition comprising a styrene-butadiene copolymer rubber gel were proposed in JP-A H6-57038 and JP-A H10-204217, respectively. These rubber compositions give rubbers having satisfactory low heat-build up, but the resulting rubbers occasionally exhibit poor abrasion resistance, reduced breaking elongation and poor mechanical properties.

An emulsion polymerization procedure is widely employed for the production of a conjugated diene rubber. In the production process by an emulsion polymerization procedure, a latex prepared by emulsion polymerization in a manner such that a desired polymer composition is obtained is coagulated with an inorganic salt as a coagulant to form crumbs having a size of about 2 to 10 mm, water is separated therefrom, and the crumbs are washed and then dried to give an object rubber. However, for example, in the case where a butadiene-styrene copolymer rubber having a high, e.g. about 35 to 50% by weight of, bound styrene content is produced by an emulsion polymerization procedure, a latex as obtained by emulsion polymerization exhibits a poor coagulability, and therefore, there is a tendency such that the latex is partly non-coagulated and the thus-formed sticky crumbs are bonded together to form unusually large crumbs. Such large crumbs have a problem such that water tends to remain inside of each crumb and thus, a substantially long period is required for drying and partial drying failure occurs to form a wet spot. Further, the sticky crumbs are liable to be deposited on an inner wall of a coagulating vessel or on stirrer vanes.

To solve the above-mentioned problems caused by the sticky crumbs, procedures for appropriately adjusting the concentration of an inorganic salt coagulant, the solid content in the latex, the coagulation temperature and the stirring conditions, or for using a polymeric flocculant or a heat-sensitive coagulant in addition to the inorganic salt coagulant. However, the above-mentioned problems are difficult or even impossible to completely solve by these procedures.

DISCLOSURE OF THE INVENTION

In view of the foregoing, a first object of the present invention is to provide a conjugated diene rubber gel capable of giving a rubber composition exhibiting improved abrasion resistance and reduced heat-build up without deterioration of mechanical properties.

A second object of the present invention is to provide a rubber composition exhibiting improved abrasion resistance and reduced heat-build up without deterioration of mechanical properties.

A third object of the present invention is to provide a process for producing a conjugated diene rubber gel with enhanced productivity.

A fourth object of the present invention is to provide a process for producing a conjugated diene-aromatic vinyl copolymer rubber having a high bound aromatic vinyl content, which is characterized as forming non-sticky crumbs and exhibiting enhanced coagulability.

Thus, in a first aspect of the present invention, there is provided a conjugated diene rubber gel comprising 80% to 99% by weight of conjugated diene monomer units and 20% to 1% by weight of aromatic vinyl monomer units and having a swelling index in the range of 16 to 70 as measured in toluene.

In a second aspect of the present invention, there is provided a rubber composition comprising a conjugated diene rubber gel comprising 80% to 99% by weight of conjugated diene monomer units and 20% to 1% by weight of aromatic vinyl monomer units and having a swelling index in the range of 16 to 70 as measured in toluene, and a rubber capable of being crosslinked with sulfur.

In a third aspect of the present invention, there is provided a process for producing a conjugated diene rubber gel having a swelling index of not larger than 70 as measured in toluene, characterized in that a monomer mixture comprising 50% to 99.9% by weight of a conjugated diene monomer, 0% to 30% by weight of an aromatic vinyl monomer, 0% to 20% by weight of other ethylenically unsaturated monomer and 0.1% to 20% by weight of a crosslinking monomer is copolymerized by an emulsion polymerization procedure.

In a fourth aspect of the present invention, there is provided a process for producing a conjugated diene-aromatic vinyl copolymer rubber, characterized in that a monomer mixture comprising 15% to 69.8% by weight of a conjugated diene monomer, 30.1% to 65% by weight of an aromatic vinyl monomer, 0% to 20% by weight of other ethylenically unsaturated monomer and 0.1% to 20% by weight of a crosslinking monomer is copolymerized by an emulsion polymerization procedure.

BEST MODE FOR CARRYING OUT THE INVENTION

Conjugated Diene Rubber Gel

The conjugated diene rubber gel of the present invention is characterized as comprising 80% to 99% by weight, preferably 83% to 95% by weight and more preferably 86% to 90% by weight, of conjugated diene monomer units and 20% to 1% by weight, preferably 17% to 5% by weight and more preferably 14% to 10% by weight, of aromatic vinyl monomer units. This conjugated diene rubber gel may be produced either by using or without use of a crosslinking monomer, but is preferably produced by copolymerization using a crosslinking monomer. If desired, other copolymerizable ethylenically unsaturated monomer may be copolymerized for the production of the copolymer rubber gel.

Thus, the conjugated diene rubber gel of the present invention usually comprises 80 to 99% by weight of conjugated diene monomer units, 1% to 20% by weight of aromatic vinyl monomer units, 0% to 19% by weight of other ethylenically unsaturated monomer units and 0% to 1.5% by weight of crosslinking monomer units. A preferable conjugated diene rubber gel of the present invention comprises 83 to 95% by weight of conjugated diene monomer units, 5% to 17% by weight of aromatic vinyl monomer units, 0% to 5% by weight of other ethylenically unsaturated monomer units and 0% to 1% by weight of crosslinking monomer units. A more preferable conjugated diene rubber gel comprises 86 to 90% by weight of conjugated diene monomer units, 10% to 14% by weight of aromatic vinyl monomer units, 0% to 1% by weight of other ethylenically unsaturated monomer units and 0% to 0.5% by weight of crosslinking monomer units.

If the amount of conjugated diene monomer units in the conjugated diene rubber gel is too small, a rubber vulcanizate has poor mechanical properties. In contrast, if the amount of conjugated diene monomer units is too large, a rubber vulcanizate exhibits poor abrasion resistance. If the amount of aromatic vinyl monomer units in the conjugated diene rubber gel is too small, a rubber vulcanizate has poor abrasion resistance. In contrast, if the amount of aromatic vinyl monomer units is too large, a rubber vulcanizate exhibits undesirably high heat-build up. If the amount of optional other ethylenically unsaturated monomer units in the conjugated diene rubber gel is too large, a rubber vulcanite having good and balanced mechanical properties, abrasion resistance and low heat-build up is difficult to obtain. The use of a crosslinking monomer is optional, but it is preferably used in an amount such that the amount of its units in the resulting conjugated diene rubber gel is in the range of 0.1% to 1.5% by weight so as to produce a rubber vulcanizate having desired mechanical properties, abrasion resistance and low heat-build up and exhibiting a swelling index, shown below, as measured in toluene.

The conjugated diene rubber gel of the present invention is characterized as exhibiting a swelling index in the range of 16 to 70 as measured in toluene. The toluene swelling index is preferably in the range of 17 to 50, more preferably 19 to 45 and especially preferably 20 to 40.

If the toluene swelling index is too small, a rubber composition having a reinforcing agent incorporated therein tends to exhibit an undesirably large Mooney viscosity and poor processability, and a rubber vulcanizate has poor elongation and poor abrasion resistance. In contrast, if the toluene swelling index is too large, a rubber vulcanizate has poor abrasion resistance and exhibits undesirably high heat-build up.

The swelling index of the conjugated diene rubber gel as measured in toluene is calculated from the following equation.

Swelling Index=weight of rubber gel as swollen with toluene/weight of rubber gel as dried.

More specifically the toluene swelling index is determined as follows. 250 g of a conjugated diene rubber gel is placed in 25 ml of toluene and the mixture is shaken for 24 hours whereby the rubber gel is swollen. The swollen rubber gel is subjected to centrifuging under a centrifugal force of at least 400,000 m/sec$^2$ by a centrifugal separator. The as-centrifuged rubber gel is weighed in a wet state (weight "a"), and then dried at 70° C. to a constant weight. The dried gel is weighed (weight "b"). The toluene swelling index is expressed by the ratio of weight "a" of wet rubber gel to weight "b" of dried rubber gel.

The conjugated diene monomer used is not particularly limited, and, as specific examples thereof, there can be mentioned 1,3-butadiene, 2-methyl-1,3-butadiene, 1,3-pentadiene and 2-chloro-1,3-butadiene. Of these, 1,3-butadiene and 2-methyl-1,3-butadiene are preferable. 1,3-butadiene is most preferable. The conjugated diene monomer may be used either alone or in combination.

The aromatic vinyl monomer used is an aromatic monovinyl compound and is not particularly limited. As specific examples thereof, there can be mentioned styrene, o-methylstyrene, m-methylstyrene, p-methylstyrene, 2,4-dimethylstyrene, o-ethylstyrene, m-ethylstyrene, p-ethylstyrene, p-t-butylstyrene, α-methylstyrene, α-methyl-p-methylstyrene, o-chlorostyrene, m-chlorostyrene, p-chlorostyrene, p-bromostyrene, 2-methyl-4,6-dichlorostyrene, 2,4-dibromostyrene and vinylnaphthalene. Of these, styrene is preferable.

Other ethylenically unsaturated monomers, which are optionally copolymerized with the conjugated diene monomer and the aromatic vinyl monomer, are not particularly limited, and include α,β-ethylenically unsaturated carboxylic acid ester monomers, α,β-ethylenically unsaturated nitrile monomers, α,β-ethylenically unsaturated carboxylic acid monomers, α,β-ethylenically unsaturated carboxylic acid amide monomers and olefin monomers.

As specific examples of the α,β-ethylenically unsaturated carboxylic acid ester monomers, there can be mentioned alkyl esters such as methyl acrylate, methyl methacrylate, ethyl acrylate, butyl acrylate, 2-ethylhexyl acrylate and lauryl methacrylate; alkoxy-substituted alkyl esters such as methoxyethyl acrylate and methoxyethoxyethyl acrylate; cyano-substituted alkyl esters such as cyanomethyl acrylate; 2-cyanoethyl acrylate and 2-ethyl-6-cyanohexyl acrylate; hydroxy-substituted alkyl esters such as 2-hydroxyethyl acrylate and 2-hydroxyethyl methacrylate; epoxy-substituted alkyl esters such as glycidyl acrylate and glycidyl methacrylate; amino-substituted alkyl esters such as N,N'-dimethylaminoethyl acrylate; halogen-substituted alkyl esters such as 1,1,1-trifluoroethyl acrylate; and complete alkyl esters of a polycarboxylic acid such as diethyl maleate, dibutyl fumarate and dibutyl itaconate.

As specific examples of the α,β-ethylenically unsaturated nitrile monomers, there can be mentioned acrylonitrile and methacrylonitrile.

As specific examples of the α,β-ethylenically unsaturated carboxylic acid monomers, there can be mentioned monocarboxylic acids such as acrylic acid and methacrylic acid; polycarboxylic acids such as maleic acid, fumaric acid and itaconic acid; and partial alkyl esters of a polycarboxylic acid such as monobutyl fumarate, monobutyl maleate and monoethyl itaconate.

As specific examples of the α,β-ethylenically unsaturated carboxylic acid amide monomers, there can be mentioned acrylamide, methacrylamide, N,N'-diemthylacrylamide, N-butoxymethylacrylamide, N-butoxymethylmethacrylamide, N-methylolacrylamide and N,N'-dimethylolacrylamide.

As preferable examples of the olefin monomers, there can be mentioned chain-like or cyclic monoolefin compounds having 2 to 10 carbon atoms, such as ethylene, propylene, 1-butene, cyclopentene and 2-norbornene.

Further, vinyl chloride, vinylidene chloride and vinylpyridine can be mentioned as the optional ethylenically unsaturated monomers.

The above-recited ethylenically unsaturated monomers may be used either alone or as a mixture of at least two thereof.

The crosslinking monomer used for forming a gel structure in enhanced efficiency is a compound having at least two, preferably 2 to 4 carbon-carbon double bonds capable of being copolymerized with a conjugated diene monomer. As specific examples of the crosslinking monomers, there can be mentioned polyvinyl aromatic compounds such as diisopropenylbenzene, divinylbenzene, triisopropenylbenzene and trivinylbenzene; unsaturated ester compounds of an α,β-ethylenically unsaturated carboxylic acid, such as vinyl acrylate, vinyl methacrylate and allyl methacrylate; unsaturated ester compounds of a polycarboxylic acid, such as diallyl phthalate, triallyl cyanurate, triallyl isocyanurate and triallyl trimellitate; unsaturated ester compounds of a polyhydric alcohol, such as ethylene glycol diacrylate, ethylene glycol dimethacrylate and propylene glycol dimethacrylate; and 1,2-polybutadiene, divinyl ether, divinyl sulfone and N,N'-m-phenylene maleimide.

Further, the crosslinking monomer includes unsaturated polyester compounds made from a polyhydric alcohol and an unsaturated polycarboxylic acid. As specific examples of the polyhydric alcohol, there can be mentioned aliphatic diols and aromatic diols, such as ethylene glycol, propylene glycol, butanediol, hexanediol, neopentylglycol and bisphenyl A; polyethylene glycol having 2 to 20, preferably 2 to 8 oxyethylene units; and polyols such as glycerine, trimethylolpropane, pentaerythritol and sorbitol. As specific examples of the unsaturated polycarboxylic acid, there can be mentioned maleic acid, fumaric acid and itaconic acid.

Of the above-recited crosslinking monomers, divinylbenzene is especially preferable. The divinylbenzene includes ortho-, meta- and para-isomeric compounds. These isomeric compounds may be used either alone or as a mixture of at least two thereof.

The conjugated diene rubber gel of the present invention preferably has a particle diameter in the range of 5 to 1,000 nm, more preferably 20 to 400 nm and especially preferably 50 to 200 nm. By the term "particle diameter" used herein, we mean a weight average particle diameter as determined as follows. The conjugated diene rubber gel is dyed with osmium tetroxide or other appropriate dye. The dyed rubber gel is fixed, and observed by a transmission electron microscope to measure the particle diameter. The measurement is made on about 100 rubber gel particles and a weight average particle diameter is calculated.

The process for producing the conjugated diene rubber gel of the present invention is not particularly limited, and includes, for example, (1) a process wherein the rubber gel is directly produced by an emulsion polymerization procedure using a crosslinking monomer, (2) a process wherein an emulsion polymerization is continued until a high conversion, e.g., at least about 90% of conversion, is obtained whereby a gel structure is produced within each latex particle, (3) a rubber latex having no gel structure, prepared by an emulsion polymerization procedure, is treated with a crosslinking compound to effect a post-crosslinking, and (4) a process wherein a rubber gel solution in an organic solvent, prepared by a solution polymerization procedure, is emulsified in water in the presence of an emulsifier, and then, prior to or after the removal of the organic solvent, the emulsified product is treated with a crosslinking compound to effect a post-crosslinking. The processes (1), (2) and (3) may be carried out either alone or in combination.

However, to produce the conjugated diene rubber gel of the present invention with a high efficiency, process (1) is preferably adopted wherein the rubber gel is directly produced by an emulsion polymerization procedure using a crosslinking monomer. In the case where the rubber gel is directly produced by an emulsion polymerization procedure, the amount of crosslinking monomer, the amount of chain transfer agent and the conversion upon termination of polymerization can be appropriately chosen so that the desired toluene swelling index is obtained.

In the case where the conjugated diene rubber gel of the present invention is directly produced by an emulsion polymerization procedure using a crosslinking monomer, the amount of crosslinking monomer is usually in the range of 0.1% to 1.5% by weight, preferably 0.1% to 1% by weight and more preferably 0.2% to 0.5% by weight, based on 100% by weight of the total monomers. In this case using a crosslinking monomer, the resulting conjugated diene rubber gel comprises 80% to 98.9% by weight, preferably 83% to 94.9% by weight and more preferably 86% to 89.8% by weight, of conjugated diene monomer units, 1% to 19.9% by weight, preferably 5% to 16.9% by weight and more preferably 10% to 13.8% by weight, of aromatic vinyl monomer units, 0% to 19% by weight, preferably 0% to 5% by weight and more preferably 0% to 1% by weight, of other ethylenically unsaturated monomer units and 0.1% to 1.5% by weight, preferably 0.1% to 1% by weight and more preferably 0.2% to 0.5% by weight, of crosslinking monomer units.

As specific examples of the crosslinking compound used for post-crosslinking conjugated diene rubber latex particles, there can be mentioned organic peroxides such as dicumyl peroxide, t-butylcumyl peroxide, bis-(t-butyl-peroxy-isopropyl)benzene, di-t-butyl peroxide, benzoyl peroxide, 2,4-dichlorobenzoyl peroxide and t-butyl perbenzoate; organic azo compounds such as azobisisobutyronitrile and azobiscyclohxanenitrile; and dimercapto compounds and polymercapto compounds, such as dimercaptoethane, 1,6-dimercaptohexane and 1,3,5-trimercapto-triazine. Of these, organic peroxides are preferable.

The reaction conditions for post-crosslinking vary depending upon the reactivity and amount of crosslinking compound, but, a reaction pressure in the range of normal pressure to high pressure (i.e., about 1 MPa), a reaction temperature in the range of room temperature to about 170° C. and a reaction time in the range of 1 minute to 24 hours can appropriately be chosen. The kind and amount of crosslinking monomer, and reaction conditions are chosen so that the desired toluene swelling index is obtained.

Process for Producing Conjugated Diene Rubber

The process for producing a conjugated diene rubber according to the present invention includes the following two processes (1) and (2). In a process (1), an emulsion copolymerization is carried out without use of or by using a small amount of an aromatic vinyl monomer to produce a conjugated diene rubber gel, namely, a monomer mixture comprising 50% to 99.9% by weight of a conjugated diene monomer, 0 to 30% by weight of an aromatic vinyl monomer, 0% to 20% by weight of other ethylenically unsaturated monomer and 0.1% to 20% by weight of a crosslinking monomer is copolymerized by an emulsion polymerization procedure to obtain a conjugated diene rubber gel having a swelling index of not larger than 70 as measured in toluene (this process (1) is hereinafter referred to as "first production process"). In a process (2), an emulsion copolymerization is carried out by using a relatively large amount of an aromatic vinyl monomer to produce a conjugated diene rubber, namely, a monomer mixture comprising 15% to 69.8% by weight of a conjugated diene monomer, 30.1% to 65% by weight of an aromatic vinyl monomer, 0% to 20% by weight of other ethylenically unsaturated monomer and 0.1% to 20% by weight of a crosslinking monomer is copolymerized by an emulsion polymerization procedure to produce a conjugated diene-aromatic vinyl copolymer rubber (this process (2) is hereinafter referred to as "second production process").

First, the first production process will be described in detail.

The monomer composition used in the first production process comprises 50% to 99.9% by weight, preferably 70% to 94.9% by weight, more preferably 74% to 89.9% by weight and especially preferably 79.5% to 85.8% by weight of a conjugated diene monomer, 0% to 30% by weight, preferably 5% to 28% by weight, more preferably 10% to 25% by weight and especially preferably 14% to 20% by weight of an aromatic vinyl monomer, 0% to 20% by weight, preferably 0% to 5% by weight and more prefarably 0% to 1% by weight of other ethylenically unsaturated monomer, and 0.1% to 20% by weight, preferably 0.1% to 2% by weight, more preferably 0.1% to 1% by weight and especially preferably 0.2% to 0.5% by weight of a crosslinking monomer.

If the amount of conjugated diene monomer is too small, a rubber vulcanizate has poor mechanical properties. In contrast, if the amount of conjugated diene monomer is too large, a rubber vulcanizate has poor abrasion resistance. If the amount of aromatic vinyl monomer is too small, a rubber vulcanizate has poor abrasion resistance. In contrast, if the amount of aromatic vinyl monomer is too large, a rubber vulcanizate exhibits undesirably high heat-build up. If the amount of optional other ethylenically unsaturated monomer is too large, a rubber vulcanizate having good and balanced mechanical properties, abrasion resistance and low heat-build up is difficult to obtain. If the amount of crosslinking monomer is too small, a rubber vulcanizate has poor abrasion resistance and exhibits high heat-build up. In contrast, if the amount of crosslinking monomer is large, a rubber composition having a reinforcing agent incorporated therein has a large Mooney viscosity and poor processability, and a rubber vulcanizate has poor abrasion resistance.

As specific examples of the conjugated diene monomer, the aromatic vinyl monomer, the other ethylenically unsaturated monomer and the crosslinking monomer, there can be mentioned those which are hereinbefore recited as monomers constituting the conjugated diene rubber gel.

The procedures and conditions adopted for emulsion polymerization are not particularly limited. Conventional emulsifiers, polymerization initiators, chain transfer agents, polymerization terminators and antioxidants can be used for emulsion polymerization.

The emulsifier used is not particularly limited and includes fatty acid soaps and rosin soaps. As specific examples of the fatty acid soaps, there can be mentioned sodium salts and potassium salts of a long chain fatty acid having 12 to 18 carbon atoms such as lauric acid, myristic acid, palmitic acid, stearic acid, oleic acid or a mixed fatty acid thereof. As specific examples of the rosin soaps, there can be mentioned sodium salts and potassium salts of a disproportionated or hydrogenated product of natural rosin such as gum rosin, wood rosin or tall oil rosin. Any particular limitation is imposed on the amount of emulsifier, but, its amount is usually in the range of 0.05 to 15 parts by weight, preferably 0.5 to 10 parts by weight and more preferably 1 to 5 parts by weight, based on 100 parts by weight of the monomers.

The polymerization initiator includes, for example, hydrogen peroxide, an organic peroxide, a persulfate and an organic azo compound, and redox catalysts comprising a combination thereof with ferric sulfate or sodium formaldehyde sulfoxylate.

As specific examples of the organic peroxide, there can be mentioned dicumyl peroxide, t-butylcumyl peroxide, bis-(t-butyl-peroxy-isopropyl)benzene, di-t-butyl peroxide, benzoyl peroxide, 2,4-dichlorobenzoyl peroxide and t-butyl perbenzoate. As specific examples of the persulfate, there can be mentioned ammonium persulfate, sodium persulfate and potassium persulfate. As specific examples of the organic azo compound, there can be mentioned azobisisobutyronitrile and azobiscyclohexanenitrile. The amount of polymerization initiator is usually in the range of about 0.001 to 1 part by weight based on 100 parts by weight of the monomers, and can be appropriately chosen so that a desired reaction rate is obtained at a desired reaction temperature.

As specific examples of the chain transfer agent, there can be mentioned mercaptans such as 2,4,4-trimethylpentane-2-thiol, 2,2,4,6,6-pentamethylheptane-4-thiol, 2,2,4,6,6,8,8-heptamethylnonane-4-thiol, t-dodecyl mercaptan and t-tetradecyl mercaptan; xanthogen disulfides such as dimethylxanthogen disulfide, diethylxanthogen disulfide and diisopropylxanthogen disulfides; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; and terpinolene, α-terpinene, γ-terpinene, dipentene, α-methylstyrene dimer (preferably containing at least 50% by weight of 2,4-diphenyl-4-methyl-1-pentene), and 2,5-dihydrofuran. These chain transfer agents may be used either alone or as a combination of at least two thereof. The amount of chain transfer agent is usually not larger than 3 parts by weight, preferably in the range of 0.05 to 1 part by weight and more preferably 0.1 to 0.6 part by weight based on 100 parts by weight of the monomers.

The polymerization terminator is not particularly limited and conventional polymerization terminators can be used. As specific examples thereof, there can be mentioned polymerization terminators having an amine structure such as hydroxylamine, sodium dimethyldithiocarbamate, diethylhydroxylamine, and hydroxylaminesulfonic acid and its alkali metal salt; polymerization terminators having no amine structure such as aromatic hydroxydithiocarboxylic acids such as hydroxydimethylbenezenedithiocarboxylic acid, hydroxydiethylbenezenedithiocarboxylic acid and hydroxydibutylbenezenedithiocarboxylic acid, and alkali metal salts thereof; and hydroquinone derivatives and catechol derivatives. These polymerization terminators may be used either alone or as a combination of at least two thereof. The amount of polymerization terminator is not particularly limited but is usually in the range of 0.1 to 10 parts by weight based on 100 parts by weight of the monomers.

As specific examples of the antioxidant, there can be mentioned hindered phenyl compounds such as 2,6-di-t-butyl-4-methylphenyl and 2,6-di-t-butyl-4-ethylphenyl; and hindered amine compounds such as diphenyl-p-phenylenediamine and N-isopropyl-N'-phenyl-p-phenylenediamine. The amount of antioxidant is usually in the range of 0.05 to 5 parts by weight based on 100 parts by weight of a polymer produced by emulsion polymerization.

The ratio by weight of the monomers to water in an emulsion polymerization system is usually in the range of 5/95 to 50/50, preferably 10/90 to 40/60 and more preferably 20/80 to 35/65. If the relative ratio of the monomers is high, undesirable coagulation tends to occur and heat of polymerization is difficult to remove. In contrast, if the relative ratio of the monomers is low, the productivity is low.

The polymerization temperature is usually in the range of −5° C. to 80° C., preferably 0° C. to 60° C., more preferably 3° C. to 30° C. and especially preferably 5° C. to 15° C. Too low polymerization temperature leads to reduction in cost and productivity. In contrast, too high polymerization temperature gives a rubber vulcanizate having poor abrasion resistance and exhibiting high heat-build up.

The conversion upon the termination of polymerization is preferably in the range of 50% to 90%, more preferably 60% to 85% and especially preferably 65% to 80%. If this conversion is too low, the productivity is low. In contrast, too high conversion gives a rubber vulcanizate having poor abrasion resistance and exhibiting high heat-build up. It is especially preferable to carry out the polymerization at a temperature of 3° C. to 30° C., and terminate the polymerization at a conversion of 60% to 85%.

In the case where the conjugated diene rubber gel is produced by emulsion polymerization, a conventional emulsion polymerization procedure can be adopted and, when the conversion reaches a predetermined value, a polymerization terminator is added to terminate the polymerization reaction. If desired, an antioxidant is added, and then residual monomers are removed by heating or steam distillation. Then, a conventional coagulant used in emulsion polymerization is added to coagulate a copolymer latex and a copolymer is recovered. As the coagulant, for example, inorganic salts such as calcium chloride, sodium chloride and aluminum sulfate, and a polymeric flocculant and a heat-sensitive coagulant can be used. The recovered copolymer is washed with water and then dried to give an object conjugated diene rubber gel. If desired, when the latex is coagulated, an extender oil can be added to give an oil-extended rubber gel.

According to the need, prior to coagulation of a latex of the conjugated diene rubber gel, a rubber latex substantially having no gel structure or a rubber gel other than that of the present invention can be incorporated in the latex of conjugated diene rubber gel. The thus-obtained latex mixture is coagulated, and a polymer composition is recovered. The recovered polymer composition is dried to give a rubber composition comprising a predetermined amount of the conjugated diene rubber gel,.

The composition of the conjugated diene rubber gel produced by the process of the present invention varies depending upon the composition of a monomer mixture charged and the conversion upon termination of polymerization. This is because the monomers usually have different reactivity in emulsion copolymerization. However, a desired composition of the conjugated diene rubber gel can be obtained by previously determine the composition of a monomer mixture charged and the conversion upon termination of polymerization.

The composition of the conjugated diene rubber gel can be determined by NMR analysis, infrared spectrophotometry, ultraviolet spectrophotometry, elemental analysis and refractive index measurement. These analyzing procedures may be adopted alone or in combination. Note, in the case when a styrene-butadiene copolymer rubber gel contains a small amount of bound divinylbenzene units, the content of bound divinylbenzene units is very difficult to determine by these analyzing procedures. However, the content of bound divinylbenzene units can be determined by calculating the difference between the amount of charged monomer and the amount of unreacted monomer in a polymerization mixture as measured after termination of polymerization.

The particle diameter of the conjugated diene rubber gel can be controlled by the ratio of monomer/water in an emulsion copolymerization system, the kind and amount of emulsifier, the kind and amount of polymerization initiator, and the polymerization temperature.

The toluene swelling index of the conjugated diene rubber gel can be controlled by the amount of crosslinking monomer, the amount of chain transfer agent and the conversion upon termination of polymerization. By the first production process, a conjugated diene rubber gel having a swelling index of not larger than 70 as measured in toluene can easily be produced with enhanced productivity.

Secondly, the second production process will be described in detail.

The monomer composition used in the second production process comprises 15% to 69.8% by weight, preferably 33% to 64.9% by weight, more preferably 39% to 54.8% by weight, and especially preferably 41.4% to 51.7% by weight of a conjugated diene monomer, 30.1% to 65% by weight, preferably 35% to 62% by weight, more preferably 45% to 60% by weight and especially preferably 48% to 58% by weight of an aromatic vinyl monomer, 0% to 20% by weight, preferably 0% to 5% by weight and more preferably 0% to 1% by weight of other ethylenically unsaturated monomer and 0.1% to 20% by weight, preferably 0.1% to 5% by weight, more preferably 0.2% to 1% by weight and especially preferably 0.3% to 0.6% by weight of a crosslinking monomer.

If the amount of conjugated diene monomer is too small or the amount of aromatic vinyl monomer is too large, the resulting copolymer rubber has undesirably high glass transition temperature and is not preferable. In contrast, if the amount of conjugated diene monomer is too large or the amount of aromatic vinyl monomer is too small, the resulting copolymer rubber gives a tire having poor road-gripping characteristics, and gives a rubber vulcanizate having undesirably high hardness. If the amount of other ethylenically unsaturated monomer is too large, a desired rubber having good and balanced properties is difficult to produce. If the amount of crosslinking monomer is too small, a latex has poor coagulability and crumbs are sticky. In contrast, if the amount of crosslinking monomer is too large, an unreacted crosslinking monomer is in many cases difficult to remove after termination of polymerization because most crosslinking monomers have a high boiling point.

The conjugated diene monomer, the aromatic vinyl monomer, the other ethylenically unsaturated monomer and the crosslinking monomer are not particularly limited, and, as specific examples thereof, there can be mentioned those which are the same as used in the first production process and hereinbefore recited as monomers constituting the conjugated diene rubber gel.

The emulsifier, polymerization initiator, chain transfer agent, polymerization initiator and antioxidant, and the procedures and conditions adopted for emulsion copolymerization may be the same as those which are explained in the first production process.

It is especially preferable in the second production process to carry out the polymerization at a temperature of $-5°$ C. to 80° C., and terminate the polymerization at a conversion of 50% to 90%.

In view of the object of producing a copolymer rubber characterized in that a latex has good coagulability and crumbs are not sticky in the second production process, it is to be noted that, when the polymerization temperature is high and the conversion upon termination of polymerization is high, coarse coagulated products having a size larger than the particle diameter of the desired latex are liable to be produced, and the resulting rubber vulcanizate tends to have poor mechanical strengths.

The procedures for coagulation in the second production process will now be described.

The coagulating agent used includes conventional inorganic metal salts, polymeric flocculants and heat-sensitive coagulating agents. As specific examples of the inorganic metal salts, there can be mentioned univalent metal salts such as sodium chloride, potassium chloride, sodium nitrate, sodium sulfate and sodium carbonate; divalent metal salts such as calcium chloride, magnesium chloride, calcium sulfate and magnesium sulfate; and trivalent metal salts such as aluminum chloride, aluminum nitrate and aluminum sulfate. Of these, calcium chloride is preferable. The amount of inorganic metal salt is usually in the range of 0.1 to 100 parts by weight, preferably 1 to 50 parts by weight and more preferably 2 to 10 parts by weight, based on 100 parts by weight of the copolymer rubber in the latex.

As specific examples of the polymeric flocculants, there can be mentioned nonionic, anionic or cationic acrylamide polymers, alkali metal salts of an anionic acrylic acid polymer, and cationic condensate resins. Of these, cationic condensate resins are preferable. The amount of polymeric flocculant is usually in the range of 0.05 to 10 parts by weight, preferably 0.2 to 5 parts by weight and more preferably 0.4 to 2 parts by weight, based on 100 parts by weight of the copolymer rubber in the latex.

As specific examples of the heat-sensitive coagulants, there can be mentioned a polyoxyethylene adduct of an alkylphenyl-formaldehyde condensate, a polyoxypropylene adduct thereof and a poly(oxyethylene-oxypropylene) adduct thereof; and a polyoxyethylene alkyl ether, a polyoxyethylene fatty acid ester, a polyoxyethylene sorbitan fatty acid ester, and an oxyethylene-oxypropylene block copolymer. Of these, a poly(oxyethylene-oxypropylene) adduct of an alkylphenyl-formaldehyde condensate is preferable. The amount of heat-sensitive coagulant is usually in the range of 0.01 to 5 parts by weight, preferably 0.05 to 2 parts by weight, based on 100 parts by weight of the copolymer rubber in the latex.

The above recited coagulants may be used either alone or in combination. When a heat-sensitive coagulant is used, an inorganic metal salt is preferably used in combination therewith.

When a latex is coagulated, an inorganic acid such as hydrochloric acid, nitric acid or sulfuric acid, or an organic acid such as acetic acid or alkylsulfuric acid is preferably used in addition to the coagulant. This is because coagulability is more enhanced by the addition of acid to render the latex acidic, especially adjust the pH value in the range of 2 to 5. The above-recited coagulants and acids are added preferably as an aqueous solution in an amount of 1 to 20 times, more preferably 2 to 15 times and especially preferably 3 to 10 times by weight of the amount of latex. When the amount of water is too small, uncoagulated latex tends to remain within crumbs. In contrast, when the amount of water is too large, coagulability is liable to be reduced.

When the latex is coagulated, it preferably has a solid content in the range of 1 to 30% by weight, more preferably 3% to 20% by weight and especially preferably 5% to 15% by weight. When the solid content is too small, the productivity is low. In contrast, when the solid content is too large, uncoagulated latex tends to remain within crumbs. When the latex is coagulated, its temperature is usually maintained in the range of 10° C. to 100° C., preferably 40° C. to 90° C. and more preferably 50° C. to 80° C. As the coagulation procedure, a procedure wherein a latex having a predetermined solid concentration is added to an aqueous solution containing a coagulant and an acid in a predetermined concentration is adopted. The addition of latex may be either batchwise or continuous.

By the second production process, a conjugated diene-aromatic vinyl copolymer rubber comprising preferably 35% to 55% by weight, more preferably 40% to 50% by weight of aromatic vinyl monomer units, and having a Mooney viscosity in the range of 30 to 300, more preferably 40 to 250 and especially preferably 50 to 200 is easily produced.

The conjugated diene-aromatic vinyl copolymer rubber is useful as rubber material for tires, cable coverings, hoses, transmission belts, conveyor belts, roll covers, shoe soles, sealing rings and vibration rubber insulators. Further, this copolymer rubber is suitable for an impact modifier for resins, an additive for adhesives, and a binder for abrasives used for working tools.

Rubber Composition

The rubber composition of the present invention comprises the above-mentioned conjugated diene rubber gel, namely, a conjugated diene rubber gel comprising 80% to 99% by weight of conjugated diene monomer units and 20% to 1% by weight of aromatic vinyl monomer units and having a swelling index in the range of 16 to 70 as measured in toluene, and a rubber capable of being crosslinked with sulfur. A preferable monomer composition for the conjugated diene rubber gel and a preferable toluene swelling index of the rubber gel are as described above.

The rubber capable of being crosslinked with sulfur is not particularly limited, but is usually chosen from those which have double bonds in an amount corresponding to an iodine value of at least 2, preferably in the range of 5 to 470. The iodine value is generally determined by measuring the degree of unsaturation by adding iodine chloride according to an glacial acetic acid immersion test, and is expressed by the amount in grams of iodine chemically bound to 100 g of rubber. The rubber capable of being crosslinked with sulfur usually has a Mooney viscosity ($ML_{1+4}$, 100° C.) in the range of 10 to 150, preferably 20 to 120.

As specific examples of the rubber capable of being crosslinked with sulfur, there can be mentioned natural rubber, synthetic polyisoprene, polybutadiene, an alkyl acrylate-butadiene copolymer, a styrene-butadiene copolymer, a styrene-isoprene copolymer, a styrene-isoprene-butadiene copolymer, an acrylonitrile-butadiene copolymer, a partially hydrogented product of acrylonitrile-butadiene copolymer, an isobutylene-isoprene copolymer an ethylene-propylene-diene copolymer, and mixtures of these rubbers. These rubbers may be previously extended with an extender oil.

Of these, natural rubber, synthetic polyisoprene, an emulsion-polymerized or solution-polymerized styrene-butadiene copolymer comprising 1% to 60% by weight, preferably 20% to 55% by weight and more preferably 20% to 50% by weight, of styrene units, polybutadiene having a high, e.g., at least 90% by weight of, cis-1,4-bond content, and mixtures of these rubbers are preferable. Natural rubber, synthetic polyisoprene, the styrene-butadiene copolymer and mixtures of these rubbers are especially preferable.

The ratio by weight of the conjugated diene rubber gel to the rubber capable of being crosslinked with sulfur in the rubber composition of the present invention is preferably in the range of 1/99 to 50/50, more preferably 5/95 to 40/60 and especially preferably 10/90 to 30/70. If the relative amount of conjugated diene rubber gel is too small, a rubber vulcanizate has poor abrasion resistance. In contrast, if the relative amount of conjugated diene rubber gel is too large, a rubber vulcanizate has poor elongation and exhibits unsatisfactory heat-build up.

A reinforcing agent and other ingredients may be incorporated in the rubber composition of the present invention. The reinforcing agent preferably includes carbon black and silica.

As specific examples of carbon black, there can be mentioned furnace black, acetylene black, thermal black, channel black and graphite. These carbon blacks may be used either alone or as a combination of at least two thereof.

The specific surface area of carbon black is not particularly limited, but, the nitrogen adsorption specific surface area ($N_2SA$) is preferably such that the lower limit is 5 $m^2/g$, more preferably 50 $m^2/g$, and the upper limit is 200 $m^2/g$, more preferably 100 $m^2/g$. When the nitrogen adsorption specific surface area is in this range, a rubber vulcanizate has good mechanical properties and abrasion resistance. The dibutyl phthalate (DBP) adsorption of carbon black is preferably such that the lower limit is 5 ml/100 g, more preferably 50 ml/100 g, and the upper limit is 400 ml/100 g, more preferably 200 ml/100 g. When the DBP adsorption is in this range, a rubber vulcanizate has good mechanical properties and abrasion resistance.

The kind of silica is not particularly limited and includes dry process white carbon, wet process white carbon, colloidal silica and precipitated silica described in JP-A S62-62838. Of these, wet process white carbon predominantly comprised of silicic acid hydrate is preferable. These silica may be used, either alone or as a combination of at least two thereof.

The specific surface area of silica is usually such that the nitrogen adsorption specific surface area as determined by BET method is not larger than 400 $m^2/g$. The nitrogen adsorption specific surface area is determined by the BET method according to ASTM D-3037-81. The silica preferably has a pH value smaller than 7.0, preferably in the range of 5.0 to 6.9.

In the case when the rubber composition of the present invention comprises silica as a reinforcing agent, a silane coupling agent can be preferably added to more reduce the heat build-up and more enhance the abrasion resistance.

The silane coupling agent is not particularly limited, and, as specific examples thereof, there can be mentioned vinyltriethoxysilane, β-(3,4-epoxycyclohexyl)-ethyltrimethoxysilane, N-(β-amoinoethyl)-γ-aminopropyltrimethoxysilane, bis(3-(triethoxysilyl)propyl)-tetrasulfide, bis(3-(triethoxysilyl)propyl)disulfide, and tetrasulfides described in JP-A H6-248116 such as γ-trimethoxysilylpropyldimethylthiocarbamyltetrasulfide and γ-trimethoxysilylpropylbenzothiazyltetrasulfide. Preferable silane coupling agents have not larger than 4 sulfur atoms in the molecule to avoid scorch at kneading.

These silane coupling agent may be used either alone or as a combination of at least two thereof. The amount of silane coupling agent is preferably such that the lower limit is 0.1 part by weight, more preferably 1 part by weight and especially preferably 2 parts by weight, and the upper limit is 30 parts by weight, more preferably 20 parts by weight and especially preferably 10 parts by weight, based on 100 parts by weight of silica.

The amount of the reinforcing agent is preferably such that the lower limit is 10 parts by weight, more preferably 20 parts by weight and especially preferably 30 parts by weight, and the upper limit is 200 parts by weight, more preferably 150 parts by weight and especially preferably 100 parts by weight, based on 100 parts by weight of the total rubber ingredients, i.e., the sum of the conjugated diene rubber gel and the rubber capable of being crosslinked with sulfur.

In the case when silica and carbon black are added in combination as a reinforcing agent in the rubber composition of the present invention, the mixing ratio thereof is appropriately chosen depending upon the use and object, but the ratio by weight of silica/carbon black is preferably in the range of 10/90 to 99/1, more preferably 20/80 to 95/5 and especially preferably 30/70 to 90/10.

In addition to the above-mentioned ingredients, ingredients other than the reinforcing agents can also be conventionally incorporated in the rubber composition of the present invention. That is, an appropriate amount of ingredients such as a crosslinking agent, a crosslinking accelerator, an accelerator activator, an antioxidant, an activator, a process oil, a plasticizer, a lubricant and a filler can be incorporated.

The crosslinking agent is not particularly limited, and, as specific examples thereof, there can be mentioned sulfur such as powdery sulfur, precipitated sulfur, colloidal sulfur, insoluble sulfur and highly dispersible sulfur; halogenatad sulfur such as sulfur monochloride and sulfur dichloride;

organic peroxides such as dicumyl peroxide and di-t-butyl peroxide; quinone dioximes such as p-quinone dioxime and p,p'-dibenzoylquinone dioxime; organic polyamine compounds such as triethylenetetramine, hexamethylenediamine carbamate and 4,4'-methylenebis-o-chloraniline; and alkylphenyl resins having a methylol group. Of these, sulfur is preferable. Powdery sulfur is especially preferable. These crosslinking agents may be used either alone or as a combination of at least two thereof.

The amount of crosslinking agent is preferably such that the lower limit is 0.1 part by weight, more preferably 0.3 part by weight and especially preferably 0.5 part by weight, and the upper limit is 15 parts by weight, more preferably 10 parts by weight and especially preferably 5 parts by weight, based on 100 parts by weight of the total rubber ingredients. When the amount of crosslinking agent is in this range, a rubber vulcanizate has low heat-build up, excellent mechanical properties and enhanced abrasion resistance.

As specific examples of the crosslinking accelerator, there can be mentioned sulfenamide crosslinking accelerators such as N-cyclohexyl-2-benozothizolsulfenamide, N-t-butyl-2-benozothizolsulfenamide, N-oxyethylene-2-benozothizolsulfenamide and N,N'-diisopropyl-2-benozothizolsulfenamide; guanidine crosslinking accelerators such as diphenylguanidine, diorthotolylguanidine and orthotolylbiguanidine; thiourea crosslinking accelerators such as diethylthiourea; thiazole crosslinking accelerators such as 2-mercaptobenzothiazole, dibenzothiazyl disulfide and 2-mercaptobenzothiazole zinc salt; thiuram crosslinking accelerators such as tetramethylthiuram monosulfide and tetramethylthiuram disulfide, dithiocarbamate crosslinking accelerators such as sodium dimethyldithiocarbamate and zinc diethyldithiocarbamate; and xanthogenate crosslinking accelerators such as sodium isopropylxanthogenate, zinc isopropylxanthogenate and zinc butylxanthogenate.

The crosslinking accelerator may be used either alone or as a combination of at least two thereof. Of the above-recited crosslinking accelerators, a sulfenamide crosslinking accelerator is preferable. The amount of crosslinking accelerator is preferably such that the lower limit is 0.1 part by weight, more preferably 0.3 part by weight and especially preferably 0.5 part by weight, and the upper limit is 15 parts by weight, more preferably 10 parts by weight and especially preferably 5 parts by weight, based on 100 parts by weight of the total rubbers.

The accelerator activator is not particularly limited, and, as specific examples thereof, there can be mentioned higher fatty acids such as stearic acid, and zinc oxide. The zinc oxide preferably has high surface activity with a particle diameter of not larger than 5 μm, and, as specific examples thereof, there can be mentioned active zinc white having a particle diameter in the range of 0.05 to 0.2 μm, and zinc white having a particle diameter in the range of 0.3 to 1 μm. The zinc oxide may be surface-treated with an amine dispersant or wetting agent.

The accelerator activator may be used either alone or as a combination of at least two thereof. The amount of crosslinking accelerator is appropriately chosen depending upon the particular kind thereof. The amount of higher fatty acid is preferably such that the lower limit is 0.05 part by weight, more preferably 0.1 part by weight and especially preferably 0.5 part by weight, and the upper limit is 15 parts by weight, more preferably 10 parts by weight and especially preferably 5 parts by weight, based on 100 parts by weight of the total rubbers. The amount of zinc oxide is preferably such that the lower limit is 0.05 part by weight, more preferably 0.1 part by weight and especially preferably 0.5 part by weight, and the upper limit is 10 parts by weight, more preferably 5 parts by weight and especially preferably 2 parts by weight, based on 100 parts by weight of the total rubbers. When the amount of accelerator activator is in this range, an uncrosslinked rubber composition has good processability and a rubber vulcanizate has excellent mechanical properties and abrasion resistance.

Activators such as silicone oil having a functional group such as an epoxy group or an alkoxysilyl group, diethylene glycol and polyethylene glycol, fillers such as calcium carbonate, talc and clay; and wax can be incorporated in the rubber composition.

Further, provided that the effect of the present invention can be achieved, the rubber composition of the present invention may comprise a homopolymer or copolymer having no conjugated diene units which is made from at least one monomer selected from epichlorohydrin, ethylene oxide, propylene oxide and allyl glycidyl ether, an acryl rubber, a fluororubber, a silicone rubber, an ethylene-propylene rubber and an urethane rubber.

The rubber composition of the present invention can be prepared by kneading together the respective ingredients according to the conventional procedure. For example, the rubber ingredients and ingredients other than a crosslinking agent and a crosslinking accelerator are first kneaded together, and then, a crosslinking agent and a crosslinking accelerator are added to the kneaded mixture to obtain the rubber composition. The first kneading of the rubber ingredients and ingredients other than a crosslinking agent and a crosslinking accelerator is preferably carried out at a temperature such that the lower limit is 80° C., more prefeably 100° C. and especially preferably 120° C., and the upper limit is 200° C., more prefeably 190° C. and especially preferably 180° C., and for a time such that the lower limit is 30 seconds, more preferably 1 minute, and the upper limit is 30 minutes. The second kneading of a crosslinking agent and a crosslinking accelerator with the first-kneaded mixture is usually carried out after the kneaded mixture is cooled to a temperature of not higher than 100° C., preferably not higher than 80° C.

The rubber composition of the present invention is usually used as a rubber vulcanizate.

The procedure for crosslinking the rubber composition is not particularly limited, and can appropriately be chosen depending upon the shape and size of rubber vulcanizate. A vulcanizable rubber composition can be filled in a mold and heated whereby molding and crosslinking are concurrently carried out, or an uncrosslinked rubber composition can be previously molded and the molded product can be heated to be thereby crosslinked. The crosslinking is carried out preferably at a temperature in the range of 120° C. to 200° C., more preferably 140° C. to 180° C. The crosslinking time is usually in the range of about 1 to 120 minutes.

The invention will now be specifically described by the following working examples. Parts and % in the following production examples, examples and comparative examples are by weight unless otherwise specified.

The properties of a raw material ingredient for rubber, a rubber composition and a rubber vulcanizate were determined as follows.

(1) Coagulability of Latex

A latex was diluted with water to adjust the solid concentration to 10%. A coagulating vessel was charged with 300 parts of an aqueous solution containing 0.06 part of calcium chloride and 0.006 part of a polymeric flocculant (cationic condensate type resin "HISET CA™" available from Dai-ichi Kogyo Seiyaku Co. Ltd.), and then, 100 parts of the diluted latex was gradually added, while being stirred for mixing, in a conventional manner whereby the latex was coagulated. The temperature of a coagulation bath within the coagulation vessel was controlled to a temperature in the range of 55° C. to 65° C. The pH value of the coagulation bath was adjusted to a value in the range of 2 to 3 by adding an aqueous 5% sulfuric acid solution. The state of coagulation was observed and expressed by the following five rating indexes. The larger the index, the more excellent the coagulability.

1: Even if the amounts of calcium chloride and polymeric flocculant are increased to 1.5 times of the above-recited amounts at the coagulation step, crumbs have a large size and are intense opaque-white.

2: Crumbs have a large size and are opaque-white to a small extent.

3: Crumbs have an acceptable size and are opaque-white to a slight extent. The opaque-whiteness gradually disappears.

4: Even if the amounts of calcium chloride and polymeric flocculant are decreased to 0.7 times of the above-recited amounts at the coagulation step, crumbs have an acceptable size and are opaque-white only to a negligible extent.

5: Even if calcium chloride is not added at the coagulation step, crumbs have an acceptable size and are opaque-white only to negligible extent.

(2) Stickiness of Crumbs

A latex was coagulated under the same conditions as mentioned above for evaluation of coagulability of latex. The state of coagulation and stickiness was observed and expressed by the following four rating indexes. The larger the index, the more satisfactory the stickiness of crumbs.

1: Crumbs are sticky and deposited onto rotational parts of a stirrer and the inner wall of a coagulation vessel, and enlarged crumbs accumulate on the bottom of the vessel.

2: Crumbs are sticky and deposited onto rotational parts of a stirrer and the inner wall of a coagulation vessel, and a large number of somewhat enlarged crumbs are observed.

3: A precipitate of somewhat enlarged crumbs is observed, but deposition of crumbs onto rotational parts of a stirrer and the inner wall of a coagulation vessel was not observed.

4: Crumbs have an acceptable size and deposition thereof onto rotational parts of a stirrer and the inner wall of a coagulation vessel was not observed in the least.

(3) Particle Diameter of Rubber Gel Particles

A latex was diluted with water to adjust the solid concentration to about 0.01%. The diluted late, was dropped onto a mesh for observation by a transmission electron microscope. The dropped latex was dyed and fixed with osmium tetroxide vapor, and then water was evaporated therefrom to prepare a sample for observation. The sample was observed by a transmission electron microscope of 20,000× to 50,000× magnification. Particle diameter (unit: nm) was observed on 100 particles, and a weight average particle diameter was calculated.

(4) Amount of Styrene Units

Amount of styrene units bound in a copolymer was measured according to JIS-K 6383. It is noted, however, that, when a copolymer comprises divinylbenzene units in addition to styrene units, the sum of styrene units and divinylbenzene units is unavoidably determined.

(5) Toluene Swelling Index

The swelling index of a rubber gel as measured in toluene was determined as follows. 250 g of a sample rubber gel was placed in 25 ml of toluene and the mixture was shaken for 24 hours whereby the rubber gel was swollen. The swollen rubber gel was subjected to centrifuging under a centrifugal force of 430,000 m/sec$^2$ by a centrifugal separator. The as-centrifuged rubber gel was weighed in a wet state (weight "a"), and then dried at 70° C. to a constant weight. The dried gel was weighed (weight "b"). The toluene swelling index is expressed by the ratio (a/b) of weight "a" of wet rubber gel to weight "b" of dried rubber gel.

(6) Mooney Viscosity:

The Mooney viscosity ($ML_{1+4}$, 100° C.) of a raw material rubber was measured according to JIS-K 6300.

(7) Mechanical Properties of Rubber Vulcanizate

Tensile strength and elongation of a rubber vulcanizate were measured according to JIS-K 6301.

(8) Abrasion Resistance Index

The abrasion resistance was measured by a Pico abrasion machine according to JIS-K 6264, and expressed in terms of an index as the abrasion resistance obtained in Comparative Example 1 being 100. The larger the abrasion resistance index, the more satisfactory the abrasion resistance.

(9) Low Heat Build Up tan δ value was measured at a temperature of 60° C. under conditions of a twist of 0.5% and a frequency of 20 Hz by "RDA-II™" available from Rheometric Scientific Inc. The smaller the tan δ (60° C.) value, the more satisfactory the low heat-build up. The tan δ (60° C.) value is expressed in terms of an index as the tan δ (60° C.) value obtained in Comparative Example 1 being 100. The larger the index of tan δ (60° C.) value, the more satisfactory the low heat-build up.

EXAMPLE 1

Production of Conjugated Diene Rubber Gel I

A pressure reaction vessel was charged with 200 parts of water, 4.5 parts of a mixture of disproportionated potassium rosinate and sodium fatty acid as an emulsifier, 0.1 part of potassium chloride, and, a monomer mixture and a chain transfer agent (t-dodecyl mercaptan), shown in Table 1. The temperature of the content was controlled to 12° C. while being stirred, and 0.1 part of cumene hydroperoxide, 0.2 part of sodium formaldehyde sulfoxylate and 0.01 part of ferric sulfate, as a radical polymerization initiator, were added to the content to initiate polymerization.

The polymerization reaction was continued at 12° C. until the conversion reached 70%, and then 0.1 part of diethylhydroxylamine was added to terminate the polymerization reaction. A part of the thus-obtained latex was taken and subjected to gas chromatography. The amounts of unreacted monomers were determined from previously prepared calibration curves. The amount of the monomer units constituting a copolymer was determined as a difference between the amount of charged monomer and the amount of unreacted monomer. The results are shown in Table 1.

Then the latex was heated and subjected to steam distillation at about 70° C. under a reduced pressure to recover unreacted monomers. To 100 parts of the thus-produced copolymer, 2 parts of 2,6-di-t-butyl-4-methylphenyl as an antioxidant was added. A part of the thus-obtained latex was taken to determine its weight average particle diameter. The results are shown in Table 1.

Then the latex was placed in a sodium chloride/sulfuric acid solution whereby the latex was coagulated. The thus-formed crumbs were taken, thoroughly washed with water, and then dried at 50° C. under a reduced pressure to give a conjugated diene rubber gel I. The amount of styrene units and toluene swelling index of conjugated diene rubber gel I are shown in Table 1.

EXAMPLES 2–6

Production of Conjugated Diene Rubber Gels II to VI

Conjugated diene rubber gels II to VI were produced by the same procedures as those described in Example 1 except that monomer mixtures having a composition shown in Table 1 and a chain transfer agent shown in Table 1 were used. The properties of the rubber gels are shown in Table 1.

EXAMPLE 7

Production of Conjugated Diene Rubber Gel VII

Conjugated diene rubber gel VII was produced by the same procedures as those described in Example 1 except that a monomer mixture having a composition shown in Table 1 and a chain transfer agent shown in Table 1 were used, 0.2 part of potassium sulfate was used as the radical polymerization initiator, and the polymerization was terminated at a conversion of 92% with all other conditions remaining the same. The properties of rubber gel VII are shown in Table 1.

Conjugated diene rubber gels I to VII contained only a negligible amount of rubber ingredient soluble in toluene.

COMPARATIVE PRODUCTION EXAMPLE 1

Production of Conjugated Diene Rubber I

Conjugated diene rubber gel I was produced by the same procedures as those described in Example 1 except that a monomer mixture having a composition shown in Table 1 was used. The amount of styrene units and toluene swelling index of conjugated diene rubber I are shown in Table 1. Conjugated diene rubber I was substantially free from gel, and hence, did not exhibit any significant measured value for toluene swelling index.

As shown in Examples 1 to 7 in Table 1, by the process of the present invention for producing a conjugated diene rubber gel, a conjugated diene rubber gel having a desired polymer composition and a desired toluene swelling index can easily be produced with enhanced productivity. In contrast, if a conjugated diene rubber gel having a desired toluene swelling index is produced from a conjugated diene rubber latex having no gel structure shown in Comparative Production Example 1, it is indispensable, after the removal of unreacted monomers from a latex as obtained by termination of polymerization, to add a peroxide to the latex and heat-treat the peroxide-added latex.

EXAMPLES 8–11, AND COMPARATIVE EXAMPLES 1–4

Production of Rubber Vulcanizates and Evaluation Thereof 100 parts of a rubber composition comprising the rubber ingredients shown in Table 1 was mixed with 40 parts of carbon black ("Seast SO™" available from Tokai Carbon K. K.), 3 parts of zinc oxide, 2 parts of stearic acid and 2 parts of N-(1,3-dimethylbutyl-N'-phenyl-p-phenylenediamine as an antioxidant, and the mixture was kneaded at 120° C. for 6 minutes by a Banbury mixer. Then the kneaded mixture was kneaded together with 1.1 parts of sulfur and 0.9 part of N-t-butyl-2-benzothiazyl sulfenamide as a crosslinking accelerator at 50° C. by an open roll to give a rubber composition. The rubber composition was press-cured at 160° C. for 12 minutes to give a rubber vulcanizate. The properties of the rubber vulcanizate were evaluated, and the results are shown in Table 2.

As seen from Table 2, a rubber vulcanizate made from a conjugated diene rubber gel containing a minor amount of styrene units has poor abrasion resistance (Comparative Example 2). A rubber vulcanizate made from a conjugated diene rubber gel containing a large amount of styrene units is not satisfactory in heat-build up (Comparative Example 3). A rubber vulcanizate made from a conjugated diene

TABLE 1

| | Examples | | | | | | | Pd. Ex. |
|---|---|---|---|---|---|---|---|---|
| | 1 | 2 | 3 | 4 | 5 | 6 | 7 | 1 |
| Conjugated Diene Rubber Gel | I | II | III | IV | V | VI | VII | — |
| Conjugated Diene Rubber | — | — | — | — | — | — | — | I |
| Monomer Mixture (parts) | | | | | | | | |
| Butadiene | 99.7 | 92.5 | 82 | 77 | 70 | 82 | 84.6 | 70 |
| Styrene | — | 7.2 | 17.7 | 22.7 | 29.7 | 16 | 15 | 30 |
| Divinylbenzene | 0.3 | 0.3 | 0.3 | 0.3 | 0.3 | 2 | 0.4 | — |
| Chain Transfer Agent | | | | | | | | |
| t-Dodecyl mercaptan | 0.3 | 0.3 | 0.3 | 0.3 | 0.3 | 0.3 | 0.3 | 0.3 |
| Polymerization Temperature (° C.) | 12 | 12 | 12 | 12 | 12 | 12 | 50 | 12 |
| Polymerization Conversion at Termination of Polymerization (%) | 70 | 70 | 70 | 70 | 70 | 70 | 92 | 70 |
| Composition of Copolymer (%) | | | | | | | | |
| Butadiene Units | 99.7 | 95 | 88 | 84 | 76 | 88 | 88 | 76 |
| Styrene Units | — | 4.8 | 11.8 | 15.8 | 23.8 | 10.4 | 11.7 | 24 |
| Divinylbenzene Units | 0.2 | 0.2 | 0.2 | 0.2 | 0.2 | 1.6 | 0.3 | — |
| Weight Average Particle Diameter (nm) | 90 | 88 | 87 | 84 | 88 | 89 | 85 | — |
| StyrenE Units (%) | 0.2 | 5 | 12 | 16 | 24 | 12 | 12 | 24 |
| Toluene Swelling Index | 23 | 25 | 22 | 20 | 23 | 4 | 25 | — |
| Mooney Viscosity | — | — | — | — | — | — | — | 46 | rubber gel having small toluene swelling index has a drastically reduced elongation and a poor abrasion resistance (Comparative Example 4).

TABLE 2

|  | Examples | | | | Comparative Examples | | | |
| --- | --- | --- | --- | --- | --- | --- | --- | --- |
|  | 8 | 9 | 10 | 11 | 1 | 2 | 3 | 4 |
| Composition of Rubber Ingredients (parts) | | | | | | | | |
| Natural Rubber | 70 | 70 | 70 | 70 | 70 | 70 | 70 | 70 |
| Conjugated Diene Rubber Gel I | — | — | — | — | — | 30 | — | — |
| Conjugated Diene Rubber Gel II | 30 | — | — | — | — | — | — | — |
| Conjugated Diene Rubber Gel III | — | 30 | — | — | — | — | — | — |
| Conjugated Diene Rubber Gel IV | — | — | 30 | — | — | — | — | — |
| Conjugated Diene Rubber Gel V | — | — | — | — | — | — | 30 | — |
| Conjugated Diene Rubber Gel VI | — | — | — | — | — | — | — | 30 |
| Conjugated Diene Rubber Gel VII | — | — | — | 30 | — | — | — | — |
| Conjugated Diene Rubber I | — | — | — | — | 30 | — | — | — |
| Physical Properties of Rubber Vulcanizate | | | | | | | | |
| Tensile Strength (MPa) | 23 | 27 | 27 | 24 | 23 | 23 | 26 | 22 |
| Elongation (%) | 440 | 500 | 490 | 510 | 450 | 420 | 420 | 320 |
| Abrasion Resistance Index | 104 | 132 | 127 | 119 | 100 | 95 | 102 | 96 |
| tan$\delta$ (60° C.) Index | 112 | 110 | 107 | 104 | 100 | 115 | 98 | 113 |

In contrast to the rubber vulcanizates of the comparative examples, rubber vulcanizates obtained in Examples 8–11 of the present invention exhibit high abrasion resistance and low heat-build up without deterioration of mechanical properties. As seen from the comparison of Example 9 with Example 11, the rubber vulcanizate made of a conjugated diene rubber gel as obtained by polymerizing at a lower temperature and terminating the polymerization at a conversion of 70% (Example 9) is superior to the rubber vulcanizate obtained in Example 11.

EXAMPLE 12

Production Of Conjugated Diene Copolymer Rubber I

A pressure reaction vessel was charged with 200 parts of water, 4.5 parts of a mixture of disproportionated potassium rosinate and sodium fatty acid as an emulsifier, 0.1 part of potassium chloride, and, a monomer mixture and a chain transfer agent (t-dodecyl mercaptan), shown in Table 3. The temperature of the content was controlled to 10° C. while being stirred, and 0.1 part of cumene hydroperoxide, 0.2 part of sodium formaldehyde sulfoxylate and 0.01 part of ferric sulfate, as a radical polymerization initiator, were added to the content to initiate polymerization.

The polymerization reaction was continued at 10° C. until the conversion reached 70%, and then 0.1 part of diethylhydroxylamine was added to terminate the polymerization reaction. Then the thus-obtained latex was heated and subjected to steam distillation at about 70° C. under a reduced pressure to recover unreacted monomers. To 100 parts of the thus-produced copolymer, 2 parts of 2,6-di-t-butyl-4-methylphenyl as an antioxidant was added.

Then water was added to the latex to adjust its solid concentration to 10%. Coagulability of the latex and stickiness of crumbs were evaluated by the above-mentioned methods. The crumbs obtained were thoroughly washed with warm, water at 60°C. and then drained. The drained crumbs were dried at 80° C. by a warm air dryer to give conjugated diene copolymer rubber I. The amount of styrene units in the copolymer rubber I and the Mooney viscosity thereof are shown in Table 3.

EXAMPLE 13–15

Production of Conjugated Diene Copolymer Rubbers II to IV

Conjugated diene copolymer rubbers II to IV were produced by the same procedures as those described in Example 1 except that monomer mixtures having a composition shown in Table 3 and a chain transfer agent shown in Table 3 were used with all other conditions remaining the same. The coagulability, stickiness of crumbs, amount of styrene units and Mooney viscosity of the copolymer rubbers are shown in Table 3.

COMPARATIVE EXAMPLES 5–7

Production of Conjugated Diene Copolymer Rubbers V to VII

Conjugated diene copolymer rubbers V, VI and VII were produced by the same procedures as those described in Example 1 except that monomer mixtures having a composition shown in Table 3 and a chain transfer agent shown in Table 3 were used with all other conditions remaining the same. The coagulability, stickiness of crumbs, amount of styrene units and Mooney viscosity of the copolymer rubbers are shown in Table 3.

REFERENCE EXAMPLES 1 and 2

Production of Conjugated Diene Copolymer Rubbers V and IX

Conjugated diene copolymer rubbers VIII and IX were produced by the same procedures as those described in Example 1 except that monomer mixtures having a composition shown in Table 3 and a chain transfer agent shown in Table 3 were used with all other conditions remaining the same. The coagulability, stickiness of crumbs, amount of styrene units and Mooney viscosity of the copolymer rubbers are shown in Table 3.

The conjugated diene copolymer rubbers I to IX had a weight average particle diameter in the range of 80 to 100 nm.

TABLE 3

|  | Examples | | | | Comp. Ex. | | | Ref. Ex. | |
| --- | --- | --- | --- | --- | --- | --- | --- | --- | --- |
|  | 12 | 13 | 14 | 15 | 5 | 6 | 7 | 1 | 2 |
| Conjugated Diene Rubber Gel | I | II | III | IV | V | VI | VII | VIII | IX |
| Monomer Mixture (parts) | | | | | | | | | |
| Butadiene | 45 | 45 | 45 | 62 | 45 | 45 | 62 | 70 | 70 |
| Styrene | 54.7 | 54.9 | 53 | 37.7 | 55 | 55 | 38 | 29.7 | 30 |
| Divinylbenzene | 0.3 | 0.1 | 2 | 0.3 | — | — | — | 0.3 | — |
| Chain Transfer Agent | | | | | | | | | |
| t-Dodecyl mercaptan | 0.3 | 0.5 | 0.3 | 0.3 | 0.3 | 0.06 | 0.3 | 0.3 | 0.3 |
| Coagulability (Index) | 5 | 4 | 5 | 4 | 1 | 1 | 3 | 4 | 3 |
| Adherence of Crumbs (Index) | 4 | 3 | 4 | 4 | 1 | 2 | 2 | 4 | 4 |
| Styrene Units (%) | 45 | 45 | 45 | 35 | 45 | 45 | 35 | 24 | 24 |
| Mooney Viscosity | 105 | 163 | 53 | 122 | 46 | 120 | 44 | 82 | 41 |

As seen from Comparative Examples 5 and 6, when copolymer rubbers comprise a large amount (45%) of styrene units, the coagulability and stickiness of crumbs were poor, and thus, the production of the copolymer rubbers is difficult. When a copolymer rubber comprises styrene units of 35%, the coagulability and stickiness of crumbs were poor (Comparative Example 7). When a copolymer rubber comprises 24% of styrene units, the coagulability and stickiness of crumbs are good (Reference Example 1). But, when a copolymer rubber produced without use of a crosslinking monomer comprises 24% of styrene units, the coagulability and stickiness of crumbs are somewhat similarly good (Reference Example 2). Therefore, the results obtained in Reference Example 1 are deemed not to be conspicuous.

In contrast, by the second production process of the present invention, butadiene-styrene copolymer rubbers comprising a large amount of styrene units and exhibiting good coagulability and satisfactorily reduced stickiness of crumbs can be obtained as seen from Examples 12 to 15.

Evaluation of Drying Characteristics of Crumb

Drying characteristics of crumbs were evaluated by the following testing method.

After draining, 100 g of a wet coagulated crumb of a conjugated diene copolymer rubber is taken in a cage with a mesh, and the cage is placed in a warm air dryer where the crumb is dried at 80° C. for 3 hours. The moisture content in the dried copolymer rubber is determined as weight reduction in weight % as measured when the dried copolymer rubber is subjected to vacuum drying at 125° C. for 30 minutes.

Copolymer rubber I obtained in Example 1 exhibited a moisture content of 0.2% by weight. In contrast, copolymer rubber V obtained in Comparative Example 1 exhibited a moisture content of 2.2% by weight and occurrence of wet spots was observed. These test results show that the conjugated diene copolymer rubber produced by the second production process of the present invention has good drying characteristics.

Industrial Applicability

The novel conjugated diene copolymer gel of the present invention gives a rubber composition.

A rubber vulcanizate made from a rubber composition comprising the conjugated diene copolymer gel, and a rubber vulcanizate made from a rubber composition comprising the conjugated diene copolymer gel and a rubber capable of being crosslinked with sulfur, can be widely used as a component of, for example, tires, cable coverings, hoses, transmission belts, conveyor belts, roll covers, shoe soles, sealing rings and vibration rubber insulators.

The rubber vulcanizate made from a rubber composition comprising the conjugated diene copolymer gel, and the rubber vulcanizate made from a rubber composition comprising the conjugated diene copolymer gel and a rubber capable of being crosslinked with sulfur, exhibit enhanced abrasion resistance and reduced heat-build up without deterioration of mechanical properties. Therefore, these rubber vulcanizates are suitable for tires, especially as components of sidewall, bead and under-tread.

According to the first production process of the present invention wherein a conjugated diene rubber gel is produced by an emulsion copolymerization without use of or using a minor amount of an aromatic vinyl monomer, a conjugated diene rubber gel exhibiting the above-mentioned properties and having a toluene swelling index not larger than 70 can easily be obtained with high productivity.

According to the second production process of the present invention wherein a conjugated diene rubber is produced by an emulsion copolymerization using a relatively large amount of an aromatic vinyl monomer, a conjugated diene-aromatic vinyl copolymer rubber characterized in that a crumb exhibits desirably reduced stickiness and a latex exhibits good coagulability can be obtained.

The invention claimed is:

1. A process for producing a conjugated diene-aromatic vinyl copolymer rubber, characterized in that a monomer mixture comprising 15% to 69.8% by weight of a conjugated diene monomer, 30.1% to 65% by weight of an aromatic vinyl monomer, 0% to 20% by weight of other ethylenically unsaturated monomer and 0.1% to 5% by weight of a crosslinking monomer is copolymerized by an emulsion polymerization procedure,
adding a coagulating agent to form a latex having a solids content of 3 to 20% by weight.

2. The process for producing a conjugated diene-aromatic vinyl copolymer rubber according to claim 1, wherein the emulsion-copolymerization reaction is carried out at a temperature in the range of −5° C. to 80° C. and terminated at a conversion in the range of 50% to 90%.

3. The process for producing a conjugated diene-aromatic vinyl copolymer rubber according to claim 1, wherein the crosslinking monomer is at least one selected from the group consisting of polyvinyl aromatic compound, unsaturated ester compound of an α,β-ethylenically unsaturated carboxylic acid, unsaturated ester compound of a polycarboxylic acid, unsaturated ester compound of a polyhydric alcohol, 1,2-polybutadiene, divinyl ether, divinyl sulfone, N,N'-m-phenylene maleimide, unsaturated polyester compound made from a polyhydric alcohol and an unsaturated polycarboxylic acid.

4. The process for producing a conjugated diene-aromatic vinyl copolymer rubber according to claim 1, wherein the solids content of the latex is 5 to 15% by weight.

* * * * *